(12) United States Patent
Hong

(10) Patent No.: US 10,699,103 B2
(45) Date of Patent: Jun. 30, 2020

(54) LIVING BODY DETECTING METHOD AND APPARATUS, DEVICE AND STORAGE MEDIUM

(71) Applicant: BAIDU ONLINE NETWORK TECHNOLOGY (BEIJING) CO., LTD., Haidian District Beijing (CN)

(72) Inventor: Zhibin Hong, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 125 days.

(21) Appl. No.: 16/034,719

(22) Filed: Jul. 13, 2018

(65) Prior Publication Data

US 2019/0034702 A1 Jan. 31, 2019

(30) Foreign Application Priority Data

Jul. 26, 2017 (CN) .......................... 2017 1 0619038

(51) Int. Cl.
*G06K 9/00* (2006.01)
*G06K 9/20* (2006.01)
(Continued)

(52) U.S. Cl.
CPC ..... *G06K 9/00288* (2013.01); *G06K 9/00255* (2013.01); *G06K 9/00906* (2013.01);
(Continued)

(58) Field of Classification Search
CPC .......... G06K 9/00671; G06K 9/00664; G06K 9/00389; G06K 9/00214; G06K 9/00711;
(Continued)

(56) References Cited

U.S. PATENT DOCUMENTS

2007/0258627 A1* 11/2007 Geng ................. G06K 9/00201
382/118
2017/0091535 A1* 3/2017 Yu ....................... G06K 9/00248
2019/0327394 A1* 10/2019 Ramirez Luna ..... H04N 5/2252

FOREIGN PATENT DOCUMENTS

CN 101964056 A 2/2011
CN 204481940 U 7/2015
(Continued)

OTHER PUBLICATIONS

Kai Guo et al., "Face recognition using both visible light image and near-infrared image and deep network", (2017) Mar. 2017, CAAI Transaction on Intelligence Technology, vol. 2, Issue 1, pp. 39-47. (Year: 2017).*

(Continued)

*Primary Examiner* — Diane D Mizrahi
(74) *Attorney, Agent, or Firm* — Brooks Kushman PC

(57) ABSTRACT

The present disclosure provides a living body detecting method and apparatus, a device and a storage medium. The method comprises: regarding a to-be-detected user, respectively obtaining a first picture and a second picture taken with two near infrared cameras and a third picture taken with a visible light camera; generating a depth map according to the first picture and second picture; determining whether the user is a living body according to the depth map and the third picture. The solution of the present disclosure can be applied to improve accuracy of detection results.

20 Claims, 4 Drawing Sheets

(51) Int. Cl.
  *G06T 7/55* (2017.01)
  *G06T 7/521* (2017.01)
  *G06K 9/62* (2006.01)

(52) U.S. Cl.
  CPC ......... *G06K 9/2018* (2013.01); *G06K 9/6267* (2013.01); *G06T 7/521* (2017.01); *G06T 7/55* (2017.01); *G06T 2207/10024* (2013.01); *G06T 2207/10028* (2013.01); *G06T 2207/10048* (2013.01)

(58) Field of Classification Search
  CPC .. G06K 9/00268; G06K 9/00288; G06T 7/60; G06T 7/55; G06T 7/73
  See application file for complete search history.

(56) References Cited

FOREIGN PATENT DOCUMENTS

| | | |
|---|---|---|
| CN | 105654028 A | 6/2016 |
| CN | 105718925 A | 6/2016 |
| CN | 106407914 A | 2/2017 |

OTHER PUBLICATIONS

Chinese Office Action dated Jan. 6, 2020, for related Chinese Appln. No. 201710619038.0; 4 Pages.

Chinese Search Report dated Dec. 26, 2019 for related Chinese Appln. No. 201710619038.0; 3 Pages.

\* cited by examiner

LIVING BODY DETECTING METHOD AND APPARATUS, DEVICE AND STORAGE MEDIUM

The present application claims the priority of Chinese Patent Application No. 201710619038.0, filed on Jul. 26, 2017, with the title of "Living body detecting method and apparatus, device and storage medium". The disclosure of the above applications is incorporated herein by reference in its entirety.

FIELD OF THE DISCLOSURE

The present disclosure relates to computer application technologies, and particularly to a living body detecting method and apparatus, a device and a storage medium.

BACKGROUND OF THE DISCLOSURE

As compared with other biological feature recognition technologies, a human face recognition technology has unique advantages in practical application: human face can be directly acquired via a camera, and the recognition procedure may be completed in a non-contacting manner conveniently and quickly.

Currently, human face recognition technology is already applied to many fields such as financing, education, scenic spots, travel and transport and social insurance. However, the human face recognition technology brings about convenience as well as some problems. For example, human face can be easily acquired so that human face can be duplicated by some people in a picture or video manner to achieve the purpose of stealing information. Particularly in the new financing industry, human face recognition technology is already gradually applied to remote account opening, money withdrawal, payment and so on, and involves users' interests.

To this end, a living body detection technology is proposed in the prior art. Plainly speaking, the so-called living body detection means detecting that the face corresponds to a "living person" during human face recognition.

Sources of non-living bodies are wide, and include photos and video displayed on a mobile phone or Pad, and printed photos on different materials (including curving, folding, clipping and hole-digging in various cases), and so on.

The living body detection is applied on important occasions such as social insurance and online account opening. For example, pension cannot be withdrawn unless an elderly user's identity is determined authentic and the elderly user is still alive through verification. Upon online account opening, this can ensure authenticity, validity and safety of the user information.

In a conventional living body detection manner, it is usual to use a single camera to acquire user pictures, perform feature extraction for the user pictures, and thereby determine whether the user is a living body according to the extracted features.

However, a detection result achieved in this manner has a lower accuracy, and a non-living body is probably mistaken as a living body.

SUMMARY OF THE DISCLOSURE

In view of the above, the present disclosure provides a living body detecting method and apparatus, a device and a storage medium, which can improve the accuracy of detection results.

Specific technical solutions are as follows:

A living body detecting method, comprising:

regarding a to-be-detected user, respectively obtaining a first picture and a second picture taken with two near infrared cameras and a third picture taken with a visible light camera;

generating a depth map according to the first picture and second picture;

determining whether the user is a living body according to the depth map and the third picture.

According to a preferred embodiment of the present disclosure, after respectively obtaining a first picture and a second picture taken with two near infrared cameras and a third picture taken with a visible light camera, the method further comprises:

performing human face detection for the third picture to obtain a human face area;

mapping the human face area into the first picture or second picture to obtain a human face area in the first picture or second picture;

determining whether the user is a living body according to the human face area in the first picture or second picture;

if yes, generating the depth map according to the first picture and second picture, and determining whether the user is a living body according to the depth map and the third picture.

According to a preferred embodiment of the present disclosure, the determining whether the user is a living body according to the human face area in the first picture or second picture comprises:

inputting the human face area in the first picture or second picture into the first classification model obtained by pre-training, to obtain an output detection result about whether the user is a living body.

According to a preferred embodiment of the present disclosure, the inputting the human face area in the first picture or second picture into the first classification model obtained by pre-training comprises:

normalizing the human face area in the first picture or second picture as a front human face picture of a predetermined size;

inputting the normalized picture into the first classification model.

According to a preferred embodiment of the present disclosure, the determining whether the user is a living body according to the depth map and the third picture comprises:

performing human face detection for the third picture to obtain a human face area;

determining depth information corresponding to pixel points in the human face area according to the depth map;

inputting the human face area and the corresponding depth information into a second classification model obtained by pre-training, to obtain an output detection result about whether the user is a living body.

According to a preferred embodiment of the present disclosure, the third picture is an Red-Green-Blue (RGB) picture, and the inputting the human face area and the corresponding depth information into a second classification model obtained by pre-training comprises:

regarding the depth information as another channel in addition to an RGB channel to obtain a four-channel human face area;

normalizing the four-channel human face area as a front human face picture of a predetermined size;

inputting the normalized picture into the second classification model.

According to a preferred embodiment of the present disclosure, before respectively obtaining a first picture and a second picture taken with two near infrared cameras and a third picture taken with a visible light camera, the method further comprises:

performing parameter matching processing for the two near infrared cameras and the visible light camera.

A living body detecting apparatus, comprising a picture obtaining unit, a depth map generating unit and a second living body detecting unit;

the picture obtaining unit is configured to, regarding a to-be-detected user, respectively obtain a first picture and a second picture taken with two near infrared cameras and a third picture taken with a visible light camera, send the first picture and second picture to the depth map generating unit, and send the third picture to the second living body detecting unit;

the depth map generating unit is configured to generate a depth map according to the first picture and second picture, and send the depth map to the second living body detecting unit;

the second living body detecting unit is configured to determine whether the user is a living body according to the depth map and the third picture.

According to a preferred embodiment of the present disclosure, the apparatus further comprises: a first living body detecting unit;

the picture obtaining unit is further configured to send the first picture, the second picture and the third picture to the first living body detecting unit;

the first living body detecting unit is configured to perform human face detection for the third picture to obtain a human face area, map the obtained human face area into the first picture or second picture to obtain a human face area in the first picture or second picture, then determine whether the user is a living body according to the human face area in the first picture or second picture, and notify the depth map generating unit and second living body detecting unit to perform their own functions if the user is a living body.

According to a preferred embodiment of the present disclosure, the first living body detecting unit inputs the human face area in the first picture or second picture into the first classification model obtained by pre-training, to obtain an output detection result about whether the user is a living body.

According to a preferred embodiment of the present disclosure, the first living body detecting unit normalizes the human face area in the first picture or second picture as a front human face picture of a predetermined size, and inputs the normalized picture into the first classification model.

According to a preferred embodiment of the present disclosure, the second living body detecting unit performs human face detection for the third picture to obtain a human face area, determine depth information corresponding to pixel points in the human face area according to the depth map, input the human face area and the corresponding depth information into a second classification model obtained by pre-training, to obtain an output detection result about whether the user is a living body.

According to a preferred embodiment of the present disclosure, the third picture is an RGB picture, the second living body detecting unit regards the depth information as another channel in addition to an RGB channel to obtain a four-channel human face area, and normalize the four-channel human face area as a front human face picture of a predetermined size, and input the normalized picture into the second classification model.

A computer device, comprising a memory, a processor and a computer program which is stored on the memory and runnable on the processor, wherein the processor, upon executing the program, implements the above-mentioned method.

A computer-readable storage medium on which a computer program is stored, wherein the program, when executed by a processor, implements the aforesaid method.

As can be seen from the above introduction, according to the solutions of the present disclosure, it is feasible to, regarding a to-be-detected user, respectively obtain a first picture and a second picture taken with two near infrared cameras and a third picture taken with a visible light camera, and it is feasible to generate a depth map according to the first picture and second picture, and then determine whether the user is a living body according to the depth map and the third picture. That is to say, when the living body detection is performed, the depth information is further referred to. The depth information may be used to judge whether the human face is planar, and thereby improve the accuracy of the detection result.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
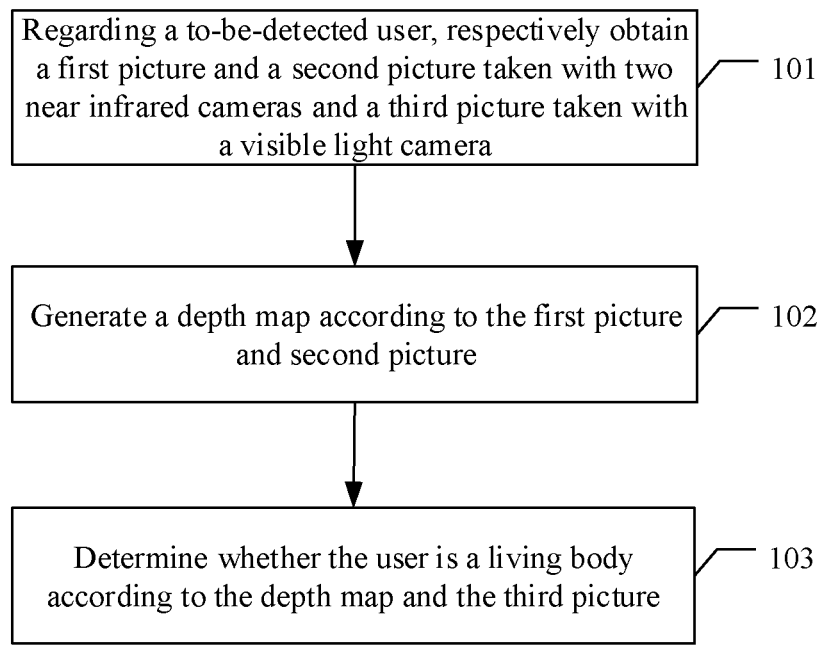
FIG. 1 is a flow chart of a first embodiment of a living body detecting method according to the present disclosure.

FIG. 1 is a flow chart of a first embodiment of a living body detecting method according to the present disclosure. As shown in FIG. 1, the embodiment comprises the following specific implementation mode.

101 relates to, regarding a to-be-detected user, respectively obtaining a first picture and a second picture taken with two near infrared cameras and a third picture taken with a visible light camera.

That is to say, in the present embodiment, there are provided three cameras: two near infrared cameras and one visible light camera.

When living body detection needs to be performed for the user, it is possible to simultaneously use the three cameras to take pictures of the user to thereby obtain two near infrared pictures and one visible light picture. For ease of depictions, the two near infrared pictures are called a first picture and a second picture respectively, and the visible light picture is called a third picture.

In addition, before using the three cameras to take pictures of the user, it is further necessary to perform parameter matching (calibration) processing for the three cameras so that there is a correspondence relationship between the pictures taken subsequently. For example, a pixel point corresponding to each pixel point on the third picture can be found on the first picture and second picture.

In 102, a depth map is generated according to the first picture and second picture.

Regarding the first picture and second picture obtained by photography, a depth map may be generated in a conventional manner for example by calculating a parallax, and the depth map is a depth map relative to the near infrared camera.

Preferably, the near infrared camera may use a raster to make emitted light carry some spot-like patterns to help subsequently perform the parallax calculation.

In 103, whether the user is a living body is determined according to the depth map and the third picture.

After the depth map and the third picture are obtained respectively, it is feasible to determine whether the user is a living body according to the depth map and the third picture, namely, obtain a living body detection result. The detection result comprises living body and non-living body.

Specifically, it is possible to first perform human face detection for the third picture to thereby obtain a detected human face area.

The human face detection refers to performing search for any given picture by employing a certain policy to determine whether it includes a human face. If yes, return a location, size, posture and so on of the human face.

A human face detection algorithm may comprise a statistics-based algorithm and a structural feature-based algorithm, wherein the statistics-based algorithm may comprise a human face detection algorithm based on histogram coarse segmentation and singular value feature and a human face detection algorithm based on Dyadic wavelet transform, and the structural feature-based algorithm comprises a human face detection algorithm based on AdaBosst algorithm and a human face detection algorithm based on facial dual-eye structural features.

When human face detection is performed for the third picture, it is possible to only use a human face detection algorithm to perform human face detection for it. To enhance the detection result, it is also possible to perform human face detection for it in a manner of combining multiple human face detection algorithms.

Regarding the human face area obtained from detection, it is feasible to respectively determine depth information corresponding to pixel points therein according to the depth map obtained in 102.

Then, it is possible to input the human face area obtained from detection and the corresponding depth information into a classification model obtained by pre-training, to obtain an output detection result about whether the user is a living body.

In practical application, the third picture is usually a RGB picture. It is feasible to regard the depth information as another channel in addition to RGB channel to obtain a four-channel human face area, and then feasible to input the four-channel human face area into the classification model to obtain an output detection result about whether the user is a living body.

Preferably, it is feasible to first perform normalization processing for the four-channel human face area, namely, normalize it as a front human face picture of a predetermined size, and then input the normalized picture into the classification model.

A specific value of the predetermined size may depend on actual needs.

If the human face obtained from the detection is not a front human face, e.g., a side human face, human face correction may be performed for it to obtain the front human face.

For example, a commonly-used human face correction manner is: first find, from a side human face, locations of feature points, including eye corner, mouth corner, and nose tip, and then perform processing such as rotation translation for the found feature points, to obtain the front human face.

The classification model is obtained by pre-training. To train to obtain the classification model, it is further necessary to pre-obtain a sufficient number of positive samples and negative samples.

The positive samples are picture samples obtained by taking pictures of a real person (a living person). The negative samples are picture samples photographed with respect to various attack manners. The attack manners includes attacking with pictures and video displayed on a mobile phone, Pad and son on, and attacking with various printed pictures on different materials.

Regarding the obtained positive samples and negative samples, it is possible to perform processing for example in a manner of generating the depth map, detecting the human face area, and performing normalization for the human face area as stated above, and train to obtain the classification model.

The procedure of training the classification model is a learning procedure of learning a matching relationship between the depth information and the RGB information. Whether the human face is planar may be judged effectively through the depth information, for example, the human face photographed with respect to the manner of attacking with pictures is planar. If the user is a real person, the photographed human face is not planar.

It can be seen that in the above embodiment, it is feasible to, regarding a to-be-detected user, respectively obtain a first picture and a second picture taken with two near infrared cameras and a third picture taken with a visible light camera, and it is feasible to generate a depth map according to the first picture and second picture, and then determine whether the user is a living body according to the depth map and the third picture. That is to say, when the living body detection is performed, the depth information is further referred to. The depth information may be used to judge whether the human face is planar, and thereby improve the accuracy of the detection result.

On this basis, to further improve the accuracy of the detection result, it is feasible to, in addition to determining whether the user is a living body according to the depth map and the third picture, further increase one step of judging whether the user is a living body one time. That is, after respectively obtaining a first picture and a second picture taken with two near infrared cameras and a third picture taken with a visible light camera, it is feasible to perform human face detection for the third picture to obtain a detected human face area, map the detected human face area into the first picture or second picture to obtain the human face area in the first picture or second picture, then determine whether the user is a living body according to the human face area in the first picture or second picture, end the processing if the user is not the living body, or further perform 102 and 103 if the user is the living body.

Preferably, it is feasible to input the human face area in the first picture or second picture into the classification model obtained by pre-training to thereby obtain an output detection result about whether the user is a living body.

To distinguish from the classification model that previously appears, the two classification model are called a first classification model and a second classification model in a sequential order of using the classification models.

Likewise, regarding the human face area in the first picture or second picture, it is possible to first perform normalization processing for it, namely normalize it as a front human face picture of a predetermined size, and then input the normalized picture into the first classification model.

The first classification model is obtained by pre-training. To train to obtain the first classification model, it is further necessary to pre-obtain a sufficient number of positive samples and negative samples.

The positive samples are picture samples obtained by taking pictures of a real person (a living person). The negative samples are picture samples photographed with respect to various attack manners.

Regarding the obtained positive samples and negative samples, it is possible to perform processing for example in a manner of detecting the human face area, mapping the human face area, and performing normalization for the human face area as stated above, and train to obtain the first classification model.

Figure 2:
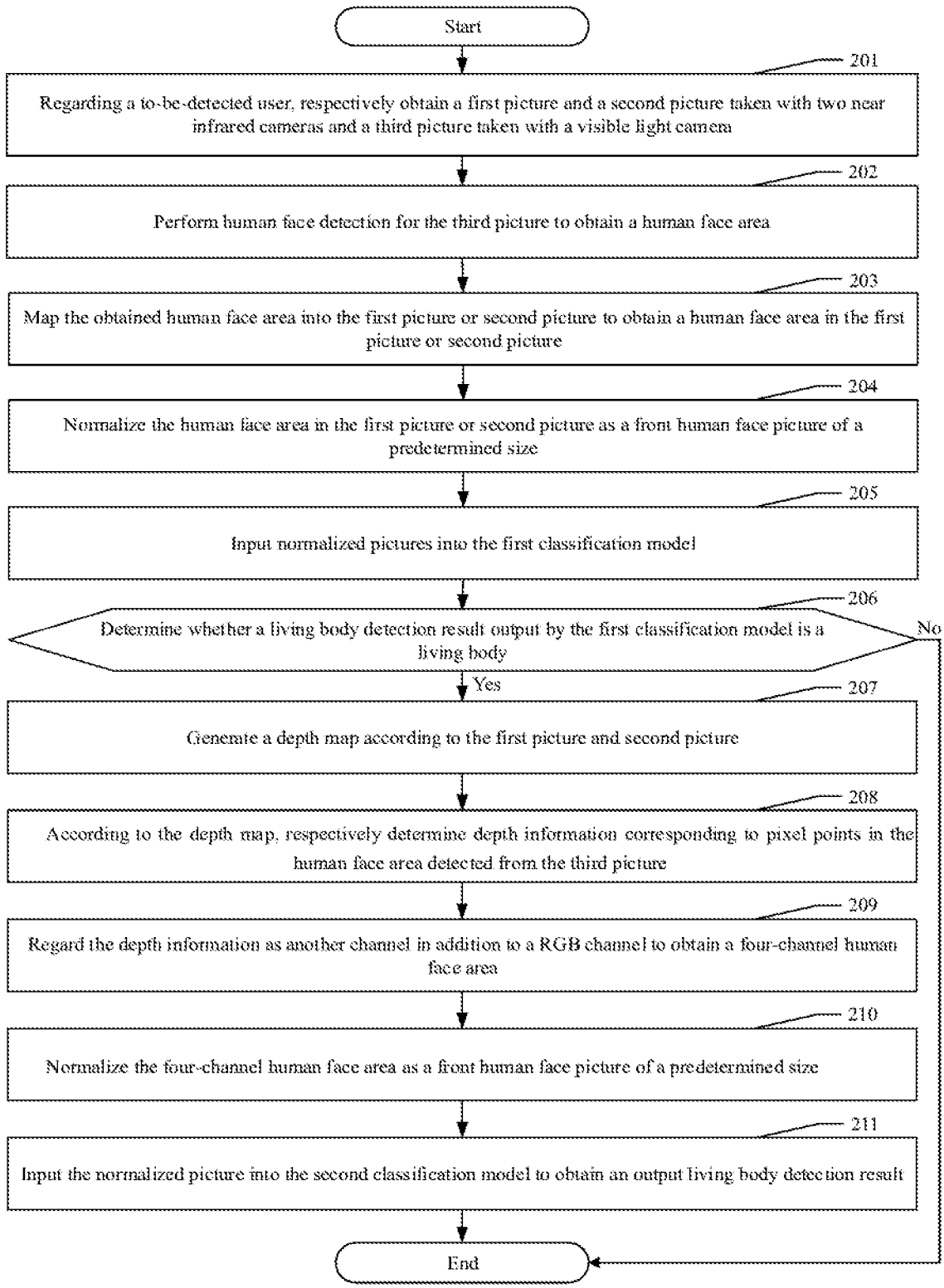
FIG. 2 is a flow chart of a second embodiment of a living body detecting method according to the present disclosure.

Based on the above introduction, FIG. 2 is a flow chart of a second embodiment of a living body detecting method according to the present disclosure. As shown in FIG. 2, the embodiment comprises the following specific implementation mode.

In 201, regarding a to-be-detected user, respectively obtain a first picture and a second picture taken with two near infrared cameras and a third picture taken with a visible light camera.

In 202, perform human face detection for the third picture to obtain a human face area.

In 203, map the obtained human face area into the first picture or second picture to obtain a human face area in the first picture or second picture.

Since a corresponding relationship exists between pixel points of respective pictures, it is very easy to determine the human face area in the first picture or second picture according to the human face area obtained by detecting the third picture.

Any one of the pictures photographed by two near infrared cameras may be selected to determine the human face area in the picture.

In 204, normalize the human face area in the first picture or second picture as a front human face picture of a predetermined size.

A specific value of the predetermined size may depend on actual needs.

As stated above, if the human face obtained from the detection is not a front human face, e.g., a side human face, human face correction may be performed for it to obtain the front human face.

For example, a commonly-used human face correction manner is: first find, from a side human face, locations of feature points, including eye corner, mouth corner, and nose tip, and then perform processing such as rotation translation for the found feature points, to obtain the front human face.

However, an imaging effect of the near infrared pictures might be undesirable. It might be much difficult to look for feature points directly from the near infrared pictures. Therefore, the present embodiment proposes that it is possible to look for feature points from the human face area obtained from detection in 202, then map these feature points into the human face area in the first picture or second picture, and then perform human face correction according to a mapping result.

In 205, normalized pictures are input into the first classification model.

206 relates to determining whether a living body detection result output by the first classification model is a living body, and if yes, ending the process, or if no, performing 207.

The content displayed on the screen usually cannot be imaged under a near infrared camera. In addition, pictures printed on different materials might have different imaging effects, and are distinct from real person imaging. Therefore, partial attacks may first be filtered by using these characteristics.

A procedure of training the first classification model is a procedure of learning these characteristics.

For example, if the user employs an attack manner of using pictures displayed on the mobile phone or pad, normal imaging cannot be normally performed, and the user is judged by the first classification model as a non-living body.

Subsequent processing manners vary depending on whether the living body detection result output by the first classification model is a living body or a non-living body. For example, in the case of a non-living body, the living body detection procedure ends and the process ends. In the case of a living body, proceed to 207.

In 207, a depth map is generated according to the first picture and second picture.

In 208, according to the depth map, respectively determine depth information corresponding to pixel points in the human face area detected from the third picture.

In 209, the depth information is regarded as another channel in addition to a RGB channel to obtain a four-channel human face area.

In 210, the four-channel human face area is normalized as a front human face picture of a predetermined size.

In 211, the normalized picture is input into the second classification model to obtain an output living body detection result, and then the process ends.

It can be seen from the above introduction that only when both the first classification model and second classification model judge that the user is the living body can the user be believed as a living body. Once any of the first classification model and second classification model judges that the user is a non-living body, the user is believed as a non-living body.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In addition, in the above embodiments, different emphasis is placed on respective embodiments, and reference may be made to related depictions in other embodiments for portions not detailed in a certain embodiment.

The above introduces the method embodiments. The solution of the present disclosure will be further described through an apparatus embodiment.

Figure 3:
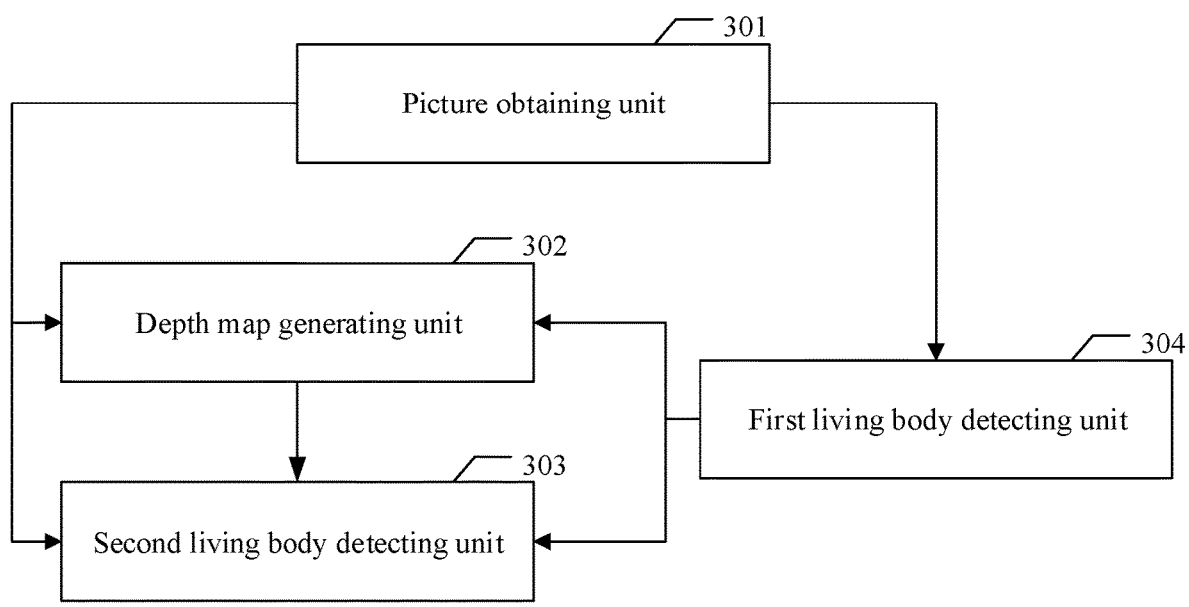
FIG. 3 is a structural schematic diagram of components of a living body detecting apparatus according to the present disclosure.

FIG. 3 is a structural schematic diagram of components of a living body detecting apparatus according to the present disclosure. As shown in FIG. 3, the living body detection apparatus comprises: a picture obtaining unit 301, a depth map generating unit 302 and a second living body detecting unit 303.

The picture obtaining unit 301 is configured to, regarding a to-be-detected user, respectively obtain a first picture and a second picture taken with two near infrared cameras and a third picture taken with a visible light camera, send the first picture and second picture to the depth map generating unit 302, and send the third picture to the second living body detecting unit 303.

The depth map generating unit 302 is configured to generate a depth map according to the first picture and second picture, and send the depth map to the second living body detecting unit 303.

The second living body detecting unit 303 is configured to determine whether the user is a living body according to the depth map and the third picture.

To perform the living body detection, there may be provided three cameras: two near infrared cameras and one visible light camera.

When the living body detection needs to be performed for the user, it is possible to simultaneously use the three cameras to take pictures of the user to thereby obtain two near infrared pictures and one visible light picture. For ease of depictions, the two near infrared pictures are called a first picture and a second picture respectively, and the visible light picture is called a third picture.

In addition, before using the three cameras to take pictures of the user, it is further necessary to perform parameter matching (calibration) processing for the three cameras.

Regarding a to-be-detected user, the picture obtaining unit 301, after respectively obtaining the first picture and the second picture taken with two near infrared cameras and the third picture taken with a visible light camera, may send the first picture and second picture to the depth map generating unit 302, and send the third picture to the second living body detecting unit 303.

The depth map generating unit 302 may, regarding the obtained first picture and second picture, generate a depth map by calculating a parallax, and send the depth map to the second living body detecting unit 303.

The second living body detecting unit 303 may determine whether the user is a living body according to the obtained depth map and the third picture, namely, obtain a living body detection result. The detection result comprises a living body and a non-living body.

Specifically, the second living body detecting unit 303 may first perform human face detection for the third picture to obtain a human face area. It is possible to only use a human face detection algorithm to perform human face detection for it. To enhance the detection result, it is also possible to perform human face detection for it in a manner of combining multiple human face detection algorithms.

Regarding the human face area obtained from detection, the living body detecting unit 303 may respectively determine depth information corresponding to pixel points therein according to the depth map.

Then, the second living body detecting unit 303 may input the human face area obtained from detection and the corresponding depth information into a second classification model obtained by pre-training, to obtain an output detection result about whether the user is a living body.

In practical application, the third picture is usually a RGB picture. The second living body detecting unit 303 may regard the depth information as another channel in addition to RGB channel to obtain a four-channel human face area, and then input the four-channel human face area into the second classification model to obtain an output detection result about whether the user is a living body.

Preferably, the second living body detecting unit 303 may first perform normalization processing for the four-channel human face area, namely, normalize it as a front human face picture of a predetermined size, and then input the normalized picture into the second classification model.

A specific value of the predetermined size may depend on actual needs.

If the human face obtained from the detection is not a front human face, e.g., a side human face, human face correction may be performed for it to obtain the front human face.

The second classification model is obtained by pre-training. To train to obtain the classification model, it is first necessary to obtain a sufficient number of positive samples and negative samples.

The positive samples are picture samples obtained by taking pictures of a real person (a living person). The negative samples are picture samples photographed with respect to various attack manners.

It can be seen that in the above embodiment, it is feasible to, regarding a to-be-detected user, respectively obtain the first picture and the second picture taken with two near infrared cameras and the third picture taken with a visible light camera, and it is feasible to generate a depth map according to the first picture and second picture, and then determine whether the user is a living body according to the depth map and the third picture. That is to say, when the living body detection is performed, the depth information is further referred to. The depth information may be used to judge whether the human face is planar, and thereby improve the accuracy of the detection result.

On this basis, to further improve the accuracy of the detection result, it is feasible to, in addition to determining whether the user is a living body according to the depth map and the third picture, further increase one step of judging whether the user is a living body one time.

Correspondingly, the apparatus shown in FIG. 3 may further comprise a first living body detecting unit 304.

The picture obtaining unit 301 may send the first picture, the second picture and third picture to the first living body detecting unit 304.

As such, the first living body detecting unit 304 may perform human face detection for the third picture to obtain a human face area, map the obtained human face area into the first picture or second picture to obtain a human face area in the first picture or second picture, then determine whether the user is a living body according to the human face area in the first picture or second picture, end the processing if the user is not a living body, and notify the depth map generating unit 302 and second living body detecting unit 303 to perform their own functions if the user is a living body.

Preferably, the first living body detecting unit 304 may input the human face area in the first picture or second picture into the first classification model obtained by pre-training, to obtain an output detection result about whether the user is a living body.

Likewise, regarding the human face area in the first picture or second picture, the first living body detecting unit 304 may first perform normalization processing for it, namely, normalize it as a front human face picture of a predetermined size, and then input the normalized picture into the first classification model.

The first classification model is obtained by pre-training. To train to obtain the classification model, it is further necessary to obtain a sufficient number of positive samples and negative samples.

The positive samples are picture samples obtained by taking pictures of a real person (a living person). The negative samples are picture samples photographed with respect to various attack manners.

Reference may be made to corresponding depictions in the aforesaid method embodiment for a specific workflow of the apparatus embodiment shown in FIG. 3. The workflow is not detailed any more.

Figure 4:
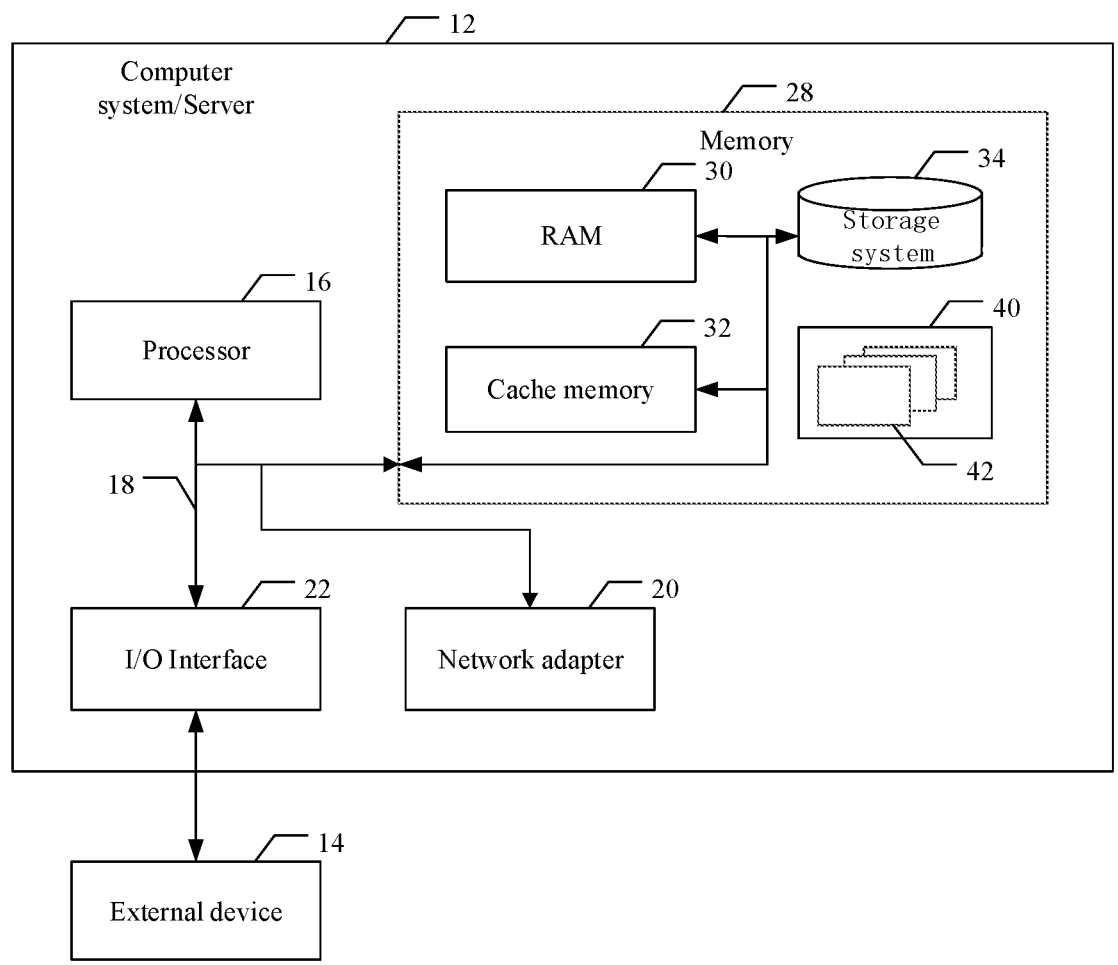
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1 or 2, namely, regarding a to-be-detected user, respectively obtaining a first picture and a second picture taken with two near infrared cameras and a third picture taken with a visible light camera, generating a depth map according to the first picture and second picture, and determining whether the user is a living body according to the depth map and the third map.

Reference may be made to related depictions in the above embodiments for specific implementations, which will not be detailed any more.

The present disclosure meanwhile provides a computer-readable storage medium on which a computer program is stored, the program, when executed by a processor, implementing the method stated in the embodiment shown in FIG. 1 or 2.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A living body detecting method, wherein the method comprises:

regarding a to-be-detected user, respectively obtaining a first picture and a second picture taken with two near infrared cameras and a third picture taken with a visible light camera;

generating a depth map according to the first picture and second picture; and determining whether the user is a living body according to the depth map and the third picture.

2. The method according to claim 1, wherein after respectively obtaining a first picture and a second picture taken with two near infrared cameras and a third picture taken with a visible light camera, the method further comprises:

performing human face detection for the third picture to obtain a human face area;

mapping the human face area into the first picture or second picture to obtain a human face area in the first picture or second picture;

determining whether the user is a living body according to the human face area in the first picture or second picture; and if yes, generating the depth map according to the first picture and second picture, and determining whether the user is a living body according to the depth map and the third picture.

3. The method according to claim 2, wherein the determining whether the user is a living body according to the human face area in the first picture or second picture comprises:

inputting the human face area in the first picture or second picture into a first classification model obtained by pre-training, to obtain an output detection result about whether the user is a living body.

4. The method according to claim 3, wherein the inputting the human face area in the first picture or second picture into the first classification model obtained by pre-training comprises:

normalizing the human face area in the first picture or second picture as a front human face picture of a predetermined size; and inputting the normalized picture into the first classification model.

5. The method according to claim 1, wherein the determining whether the user is a living body according to the depth map and the third picture comprises:

performing human face detection for the third picture to obtain a human face area;

determining depth information corresponding to pixel points in the human face area according to the depth map; and inputting the human face area and the corresponding depth information into a second classification model obtained by pre-training, to obtain an output detection result about whether the user is a living body.

6. The method according to claim 5, wherein the third picture is an Red-Green-Blue (RGB) picture, and the inputting the human face area and the corresponding depth information into a second classification model obtained by pre-training comprises:

regarding the depth information as another channel in addition to an Red-Green-Blue (RGB) channel to obtain a four-channel human face area, normalizing the four-channel human face area as a front human face picture of a predetermined size; and inputting the normalized picture into the second classification model.

7. The method according to claim 1, wherein
before respectively obtaining a first picture and a second picture taken with two near infrared cameras and a third picture taken with a visible light camera, the method further comprises:
performing parameter matching processing for the two near infrared cameras and the visible light camera.

8. A computer device, comprising a memory, a processor and a computer program which is stored on the memory and runnable on the processor, wherein the processor, upon executing the program, implements a living body detecting method, wherein the method comprises:
regarding a to-be-detected user, respectively obtaining a first picture and a second picture taken with two near infrared cameras and a third picture taken with a visible light camera;
generating a depth map according to the first picture and second picture; and
determining whether the user is a living body according to the depth map and the third picture.

9. The computer device according to claim 8, wherein
after respectively obtaining a first picture and a second picture taken with two near infrared cameras and a third picture taken with a visible light camera, the method further comprises:
performing human face detection for the third picture to obtain a human face area;
mapping the human face area into the first picture or second picture to obtain a human face area in the first picture or second picture;
determining whether the user is a living body according to the human face area in the first picture or second picture; and
if yes, generating the depth map according to the first picture and second picture, and determining whether the user is a living body according to the depth map and the third picture.

10. The computer device according to claim 9, wherein
the determining whether the user is a living body according to the human face area in the first picture or second picture comprises:
inputting the human face area in the first picture or second picture into a first classification model obtained by pre-training, to obtain an output detection result about whether the user is a living body.

11. The computer device according to claim 10, wherein
the inputting the human face area in the first picture or second picture into the first classification model obtained by pre-training comprises:
normalizing the human face area in the first picture or second picture as a front human face picture of a predetermined size; and
inputting the normalized picture into the first classification model.

12. The computer device according to claim 8, wherein
the determining whether the user is a living body according to the depth map and the third picture comprises:
performing human face detection for the third picture to obtain a human face area;
determining depth information corresponding to pixel points in the human face area according to the depth map;
inputting the human face area and the corresponding depth information into a second classification model obtained by pre-training, to obtain an output detection result about whether the user is a living body.

13. The computer device according to claim 12, wherein
the third picture is an Red-Green-Blue (RGB) picture, and the inputting the human face area and the corresponding depth information into a second classification model obtained by pre-training comprises:
regarding the depth information as another channel in addition to an RGB channel to obtain a four-channel human face area,
normalizing the four-channel human face area as a front human face picture of a predetermined size; and
inputting the normalized picture into the second classification model.

14. The computer device according to claim 8, wherein
before respectively obtaining a first picture and a second picture taken with two near infrared cameras and a third picture taken with a visible light camera, the method further comprises:
performing parameter matching processing for the two near infrared cameras and the visible light camera.

15. A non-transitory computer-readable storage medium on which a computer program is stored, wherein the program, when executed by a processor, implements a living body detecting method, wherein the method comprises:
regarding a to-be-detected user, respectively obtaining a first picture and a second picture taken with two near infrared cameras and a third picture taken with a visible light camera;
generating a depth map according to the first picture and second picture; and
determining whether the user is a living body according to the depth map and the third picture.

16. The non-transitory computer-readable storage medium according to claim 15, wherein
after respectively obtaining a first picture and a second picture taken with two near infrared cameras and a third picture taken with a visible light camera, the method further comprises:
performing human face detection for the third picture to obtain a human face area;
mapping the human face area into the first picture or second picture to obtain a human face area in the first picture or second picture;
determining whether the user is a living body according to the human face area in the first picture or second picture; and
if yes, generating the depth map according to the first picture and second picture, and determining whether the user is a living body according to the depth map and the third picture.

17. The non-transitory computer-readable storage medium according to claim 16, wherein
the determining whether the user is a living body according to the human face area in the first picture or second picture comprises:
inputting the human face area in the first picture or second picture into a first classification model obtained by pre-training, to obtain an output detection result about whether the user is a living body.

18. The non-transitory computer-readable storage medium according to claim 17, wherein
the inputting the human face area in the first picture or second picture into the first classification model obtained by pre-training comprises:
normalizing the human face area in the first picture or second picture as a front human face picture of a predetermined size; and
inputting the normalized picture into the first classification model.

19. The non-transitory computer-readable storage medium according to claim 15, wherein
the determining whether the user is a living body according to the depth map and the third picture comprises:
performing human face detection for the third picture to obtain a human face area;
determining depth information corresponding to pixel points in the human face area according to the depth map; and
inputting the human face area and the corresponding depth information into a second classification model obtained by pre-training, to obtain an output detection result about whether the user is a living body.

20. The non-transitory computer-readable storage medium according to claim 19, wherein
the third picture is an Red-Green-Blue (RGB) picture, and the inputting the human face area and the corresponding depth information into a second classification model obtained by pre-training comprises:
regarding the depth information as another channel in addition to an RGB channel to obtain a four-channel human face area,
normalizing the four-channel human face area as a front human face picture of a predetermined size; and
inputting the normalized picture into the second classification model.

* * * * *